United States Patent
Balasubramanian et al.

(10) Patent No.: US 9,531,603 B2
(45) Date of Patent: Dec. 27, 2016

(54) RECONCILING INTERNET DNS ZONE FILE CHANGES WITH ORIGIN CHANGE REQUESTS

(71) Applicant: VERISIGN, INC., Reston, VA (US)

(72) Inventors: Ramesh Balasubramanian, Bangalore (IN); Brian Coppola, Arlington, VA (US); Punit Rathore, Ashburn, VA (US); Surabhi Sudha, Sterling, VA (US)

(73) Assignee: VERISIGN, INC., Reston, VA (US)

( * ) Notice: Subject to any disclaimer, the term of this patent is extended or adjusted under 35 U.S.C. 154(b) by 252 days.

(21) Appl. No.: 14/209,783

(22) Filed: Mar. 13, 2014

(65) Prior Publication Data
US 2014/0280916 A1 Sep. 18, 2014

Related U.S. Application Data (60) Provisional application No. 61/784,693, filed on Mar. 14, 2013.

(51) Int. Cl.
*H04L 12/26* (2006.01)
*H04L 29/12* (2006.01)

(52) U.S. Cl.
CPC .......... *H04L 43/04* (2013.01); *H04L 61/1511* (2013.01)

(58) Field of Classification Search
CPC .. H04L 61/1511; H04L 63/0245; H04L 29/06; H04L 61/302
See application file for complete search history.

(56) References Cited

U.S. PATENT DOCUMENTS

| | | |
|---|---|---|
| 6,769,031 B1 | 7/2004 | Bero |
| 6,880,007 B1 | 4/2005 | Gardos et al. |
| 6,895,431 B1 | 5/2005 | Bero |
| 7,076,541 B1 | 7/2006 | Burstein et al. |
| 7,467,230 B2 | 12/2008 | Majumdar et al. |
| 7,720,998 B2 | 5/2010 | Foote et al. |
| 7,987,251 B2 | 7/2011 | Blinn et al. |
| 2010/0325723 A1 | 12/2010 | Essawi et al. |

(Continued)

FOREIGN PATENT DOCUMENTS

EP 2528304 A1 11/2012

OTHER PUBLICATIONS

Unilogic.se, Eagle DNS Documentation version 1.1, May 31, 2011.*

(Continued)

*Primary Examiner* — Brian J Gillis
*Assistant Examiner* — Matthew Ballard
(74) *Attorney, Agent, or Firm* — MH2 Technology Law Group, LLP (57) ABSTRACT

Techniques for monitoring zone file changes are presented. The techniques may include obtaining at least one zone change request and parsing the at least one zone change request to obtain at least one change request unit. The techniques may include obtaining a last published zone file, obtaining a new zone file, and comparing the last published zone file to the new zone file to obtain at least one difference object. The techniques may include matching the at least one difference object to the at least one change request unit to identify at least one unmatched difference object. The techniques may include providing a human readable report comprising an indication of the at least one unmatched difference object.

20 Claims, 5 Drawing Sheets

(56) References Cited

U.S. PATENT DOCUMENTS

2011/0060950 A1* 3/2011 Waldron ............. G06F 11/1451
714/48
2012/0304004 A1* 11/2012 Gould ................. H04L 61/1511
714/15

OTHER PUBLICATIONS

Yan Chen et al., "DiffXML: Change Detection in XML Data", LNCS, vol. 2973, Mar. 2004, pp. 289-301.
Extended European Search Report dated Feb. 17, 2015, European Application No. 14160051.0 filed Mar. 14, 2014, pp. 1-13.
Banday, "Recent Developments in the Domain Name System", International Journal of Computer Applications, vol. 31, Issue 2, Oct. 2011, pp. 18-25.

* cited by examiner

| RZDiffRecord | EPPCRUnit |
|---|---|
| Add NS<br>302 | • DomainCreateHostAdd<br>• DomainUpdateHostAdd<br>• HostUpdateHostNameChange |
| Del NS<br>304 | • DomainDelete<br>• DomainUpdateHostRemove<br>• HostUpdateHostNameChange |
| Add A/AAAA<br>306 | • DomainCreateHostAdd<br>• DomainUpdateHostAdd<br>• HostUpdateIPAdd<br>• HostUpdateHostNameChange |
| Del A/AAAA<br>308 | • DomainDelete<br>• DomainUpdateHostRemove<br>• HostUpdateIPRemove<br>• HostUpdateHostNameChange |
| Add DS<br>310 | • DomainCreateDSAdd<br>• DomainUpdateDSAdd<br>• DomainUpdateDSChange<br>• DomainUpdateHostAdd |
| Del DS<br>312 | • DomainDelete<br>• DomainUpdateDSRemove<br>• DomainUpdateDSChange<br>• DomainUpdateHostRemove |

RECONCILING INTERNET DNS ZONE FILE CHANGES WITH ORIGIN CHANGE REQUESTS

RELATED APPLICATION

The present application claims the benefit of, and priority to, U.S. Provisional Patent Application No. 61/784,693, entitled, "METHOD AND SYSTEM FOR RECONCILING INTERNET DNS ZONE FILE CHANGES WITH ORIGIN CHANGE REQUESTS" filed Mar. 14, 2013, the entirety of which is hereby incorporated by reference.

TECHNICAL FIELD

The techniques provided herein relate to ensuring the accuracy of domain name system zone files.

SUMMARY

According to some implementations, a method for monitoring zone file changes is provided. The method includes obtaining at least one zone change request and parsing the at least one zone change request to obtain at least one change request unit. The method also includes obtaining a last published zone file, obtaining a new zone file, and comparing the last published zone file to the new zone file to obtain at least one difference object. The method also includes matching the at least one difference object to the at least one change request unit to identify at least one unmatched difference object. The method also includes providing a human readable report comprising an indication of the at least one unmatched difference object.

Various optional features of the above implementations include the following. Each change request unit may be a smallest possible unit that can be executed on a domain or a host. Each change request unit may be of the form of one of: DomainCreateHostAdd, DomainCreateDSAdd, Domain Delete, DomainUpdateHostAdd, DomainUpdateHostRemove, DomainUpdateDSAdd, Domain UpdateDSRemove, DomainUpdateDSChange, HostUpdateIPAdd, HostUpdateIPRemove, and HostUpdateHostNameChange. Each difference object may include a DNSJAVA object. Each difference object may include an org.xbill.DNS.record object. Each difference object may be of the form of one of: AddNameServer, DeleteNameServer, AddA/AAAA, DeleteA/AAAA, AddDelegationSigner, and DeleteDelegationSigner. The matching may include, for each difference object, searching for a corresponding change request unit. The method may include filtering the at least one difference object to remove DNSSEC records. The method may include altering the new zone file to account for the at least one unmatched difference object, such that a corrected new zone file is produced, and providing the corrected new zone file for publishing. The at least one zone change request may include at least one root zone change request, the last published zone file may include a last published root zone file, and the new zone file may include a new root zone file.

According to some implementations, a system for monitoring zone file changes is presented. The system includes at least one processor configured to obtain at least one zone change request, and at least one processor configured to parse the at least one zone change request to obtain at least one change request unit. The system also includes at least one processor configured to obtain a last published zone file, at least one processor configured to obtain a new zone file, and at least one processor configured to compare the last published zone file to the new zone file to obtain at least one difference object. The system also includes at least one processor configured to match the at least one difference object to the at least one change request unit to identify at least one unmatched difference object. The system also includes at least one processor configured to generate a human readable report comprising an indication of the at least one unmatched difference object.

Various optional features of the above implementations include the following. Each change request unit may be a smallest possible unit that can be executed on a domain or a host. Each change request unit may be of the form of one of: DomainCreateHostAdd, DomainCreateDSAdd, Domain Delete, DomainUpdateHostAdd, DomainUpdateHostRemove, DomainUpdateDSAdd, Domain UpdateDSRemove, DomainUpdateDSChange, HostUpdateIPAdd, HostUpdateIPRemove, and HostUpdateHostNameChange. Each difference object may include a DNSJAVA object. Each difference object may include an org.xbill.DNS.record object. Each difference object may be of the form of one of: AddNameServer, DeleteNameServer, AddA/AAAA, DeleteA/AAAA, AddDelegationSigner, and DeleteDelegationSigner. The at least one processor configured to match may be further configured to, for each difference object, search for a corresponding change request unit. The system may include at least one processor configured to filter the at least one difference object to remove DNSSEC records. The system may include at least one processor configured to alter the new zone file to account for the at least one unmatched item, such that a corrected new zone file is produced, and at least one processor configured to provide the corrected new zone file for publishing. The at least one zone change request may include at least one root zone change request, the last published zone file may include a last published root zone file, and the new zone file may include a new root zone file.

DESCRIPTION OF DRAWINGS

The accompanying drawings, which are incorporated in and constitute a part of this specification, illustrate implementations of the described technology. In the figures.

DETAILED DESCRIPTION

The Domain Name System (DNS) provides, among other things, internet protocol (IP) addresses corresponding to domains. To that end, DNS includes a distributed hierarchal arrangement of databases, such as zone files, reflecting this correspondence. Root zone files, in particular, include the names and IP addresses of authoritative DNS servers for all top-level domains (TLD), such as ORG, COM, and NET. Other DNS servers forward received queries for which they do not have any information about authoritative servers to a root name server. Root name servers answer such queries with a referral to the authoritative servers for the appropriate TLD, or with an indication that no such TLD exists.

Root zone files do not change very frequently, however, their integrity and accuracy is important for the proper functioning of the internet. Internet Assigned Numbers Authority (IANA) representatives may submit to DNS registers zone file change requests using Extensible Provisioning Protocol (EPP), e.g., to change a root zone file. In some systems, each change request gets converted to one or more Root Zone Change Requests (RZCR) as part of the register's implementing the requested root zone file.

In general, some embodiments assist in ensuring the integrity of zone files. Some embodiments verify whether all the differences between a newly generated root zone file and a last published root zone file arose due to properly submitted change requests. Thus, some embodiments ensure that no unauthorized changes are being performed in a root zone. In particular, some embodiments map, on the one hand, differences between last-published and current zone files, to, on the other hand, zone file change requests. Note that some embodiments can perform such validations for any zone file, not limited to root zone files.

Figure 4:
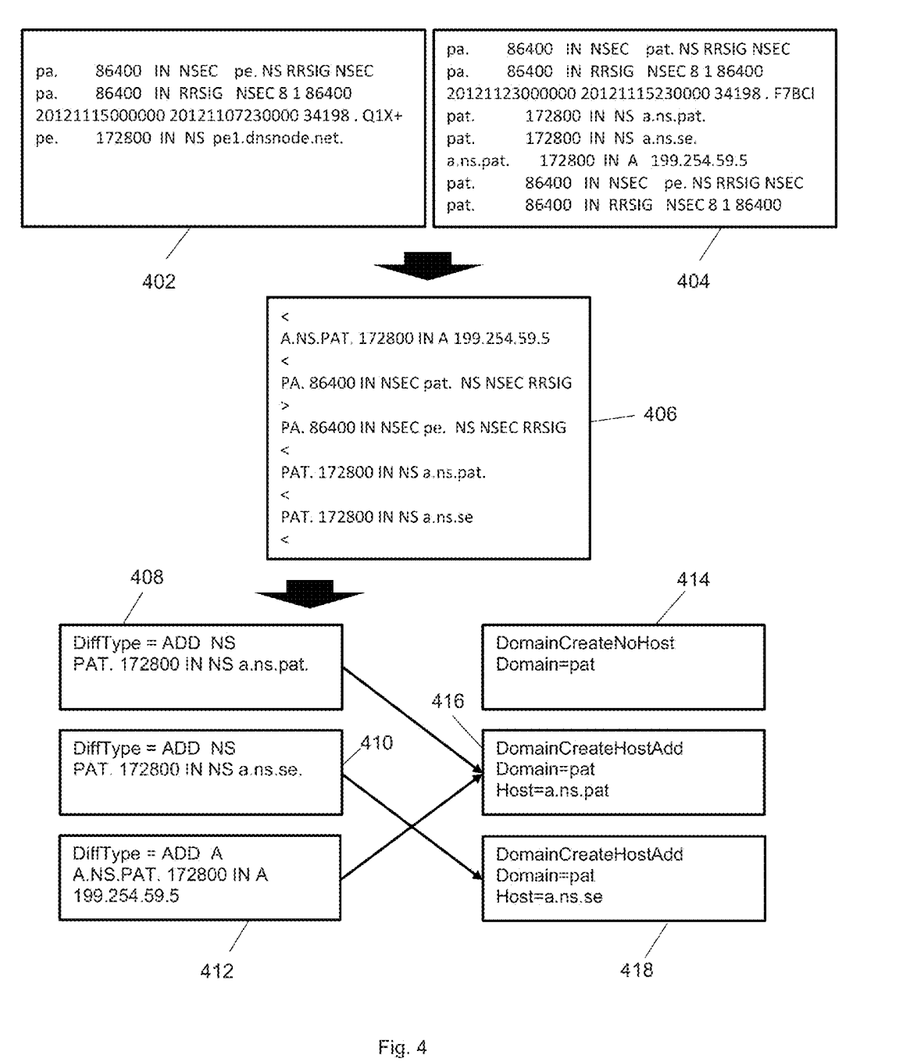
FIG. 4 is a schematic diagram illustrating a technique for detecting unrequested zone file changes according to some embodiments.
Figure 5:
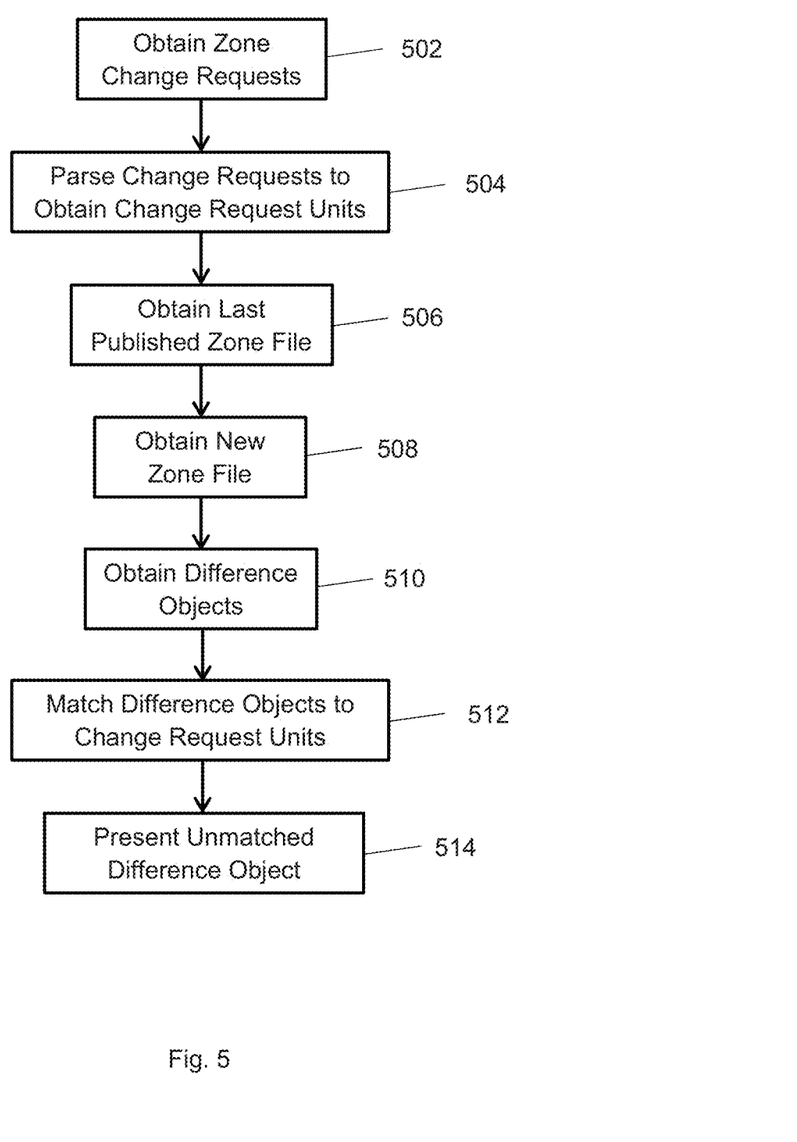
FIG. 5 is a flowchart of a method for detecting unrequested zone file changes according to some embodiments.

To perform the matching, some embodiments perform the following tasks, illustrated with respect to the figures as described. Embodiments may convert information from a newly-generated zone file and a last-published zone file (e.g., obtained from a shadow name server) into a set of formatted difference objects. This process is described in reference to FIGS. 1, 2, 4 and 5. Embodiments may compare the formatted objects so as to generate custom difference objects storing the relevant differential data. This process is described in reference to FIGS. 1, 2, 4 and 5. Embodiments may map the custom difference objects to parsed change requests so as to identify any unmatched custom difference objects. This process is described in reference to FIGS. 3, 4 and 5. Embodiments may identify any unmatched custom difference objects in a user-friendly format, so that an administrator may further investigate the cause of the zone file change. This process is described in reference to FIGS. 4 and 5. Note that FIGS. 4 and 5 illustrate overviews of some embodiments.

Reference will now be made in detail to example implementations, which are illustrated in the accompanying drawings. Where possible the same reference numbers will be used throughout the drawings to refer to the same or like parts.

Figure 1:
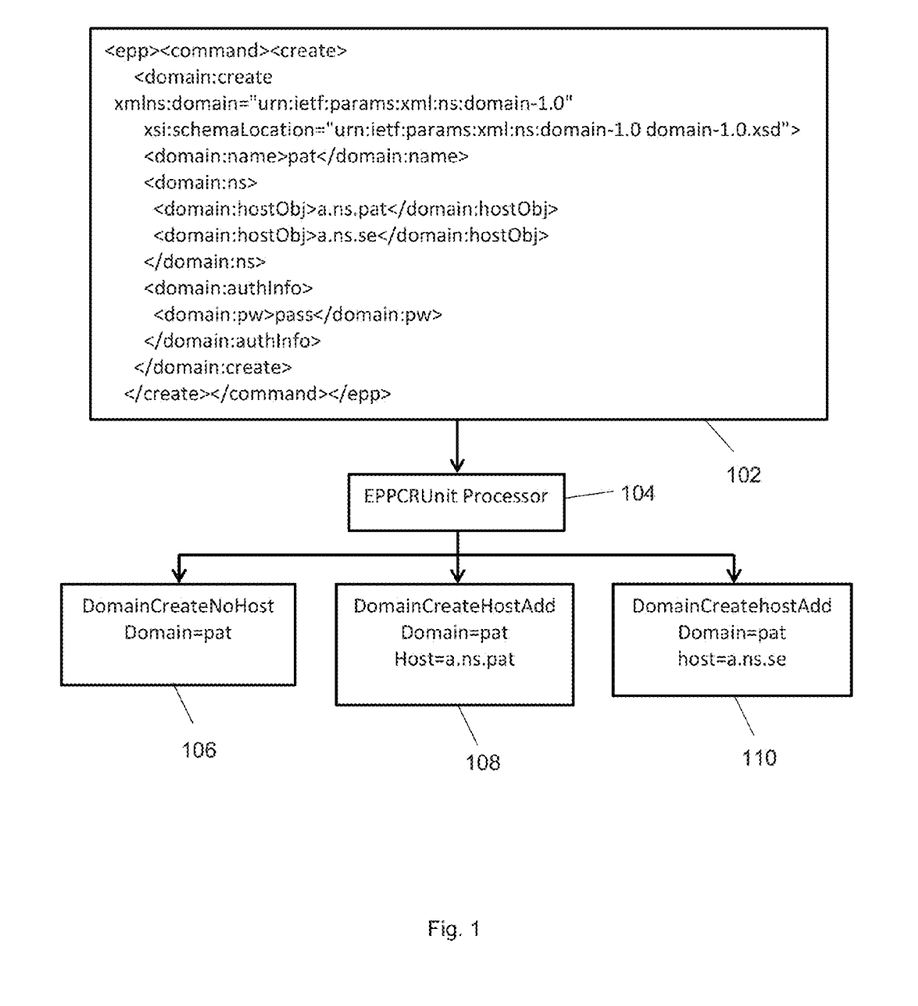
FIG. 1 is a schematic diagram of a technique for parsing change requests into change request units according to some embodiments.

FIG. 1 is a schematic diagram of a technique for parsing change requests into change request units according to some embodiments. In particular, FIG. 1 illustrates an EPPCRUnit Processor 104 dividing RZCR 102 into units 106, 108, 110, each of which has a discrete, definitive action. EPPCRUnit Processor 104 may be implemented in a properly programmed computer, for example.

In general, each EPP command might carry a collection of actions to be executed on a domain or host. Such collective commands may be parsed into the smallest possible units that each imply a complete, discrete, independent action to be executed on a domain or host. Such a unit may be referred to herein as an "EPPCRUnit." Each EPPCRUnit reflects a discrete and unambiguous task.

In particular, RZCR EPP command 102 includes a request to create a new domain with a list of two hosts. EPPCRUnit Processor 104 parses command 102 into EPPCRUnit 106, which includes instructions to create a domain, EPPCRUnit 108, which includes instructions to add a host of the domain, and EPPCRUnit 110, which includes instructions to add another host of the domain.

According to some embodiments, each EPPCRUnit can be considered as one of: DomainCreateHostAdd, DomainCreateDSAdd DomainDelete, DomainUpdateHostAdd, DomainUpdateHostRemove, DomainUpdateDSAdd, DomainUpdateDSRemove, DomainUpdateDSChange, HostUpdateIPAdd, HostUpdateIPRemove, or HostUpdateHostNameChange.

Figure 2:
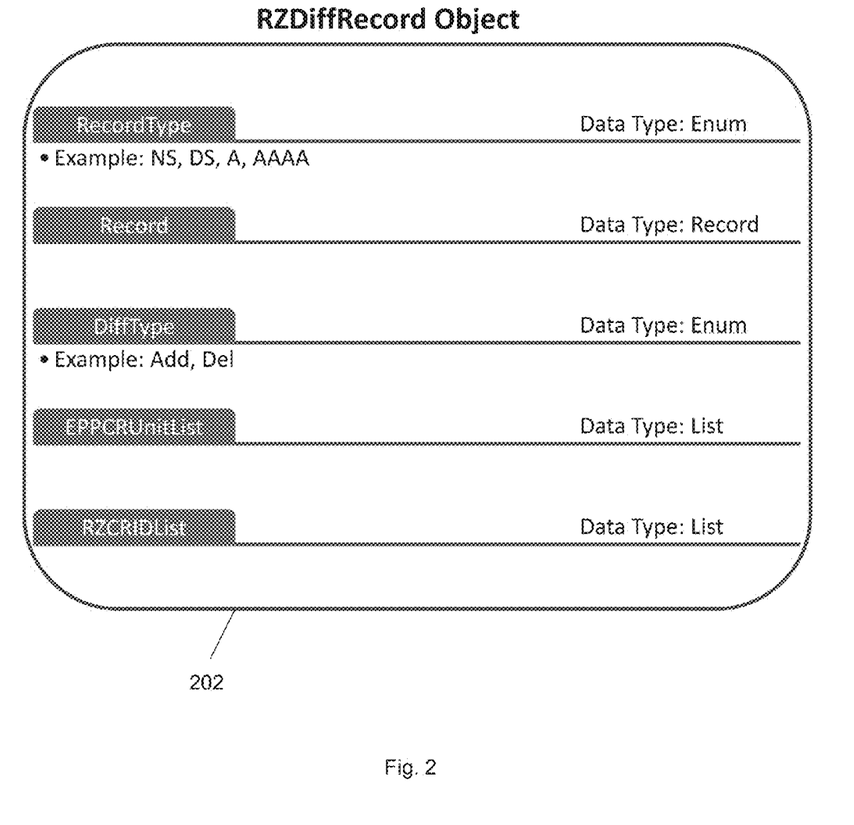
FIG. 2 is a schematic diagram of a difference object structure according to some embodiments.

FIG. 2 is a schematic diagram of a difference object structure according to some embodiments. As discussed herein, some embodiments generate custom difference objects, each referred to as a "RZDiffRecord", representing differences between a newly-generated zone file and a last-published zone file. These custom difference objects may be formatted as, e.g., org.xbill.DNS.record object. As shown in FIG. 2, each difference object may include a field representing a DNS record type for which the difference is identified, e.g., NS, DS, A, or AAAA. Each difference object further includes a field that includes a copy of, or at least identifies, the relevant zone file record that got added to or deleted from. Each difference object further includes a field that includes data representing the type of difference identified, e.g., "ADD", representing added data, or "DEL", representing deleted data. Each difference object further includes a field "EPPCRUnitList" storing mapped RZCR identifications. Finally, each difference record includes a field to store any associated EPPCRUnits. Identifying associated EPPCRUnits is discussed at length herein.

Figure 3:
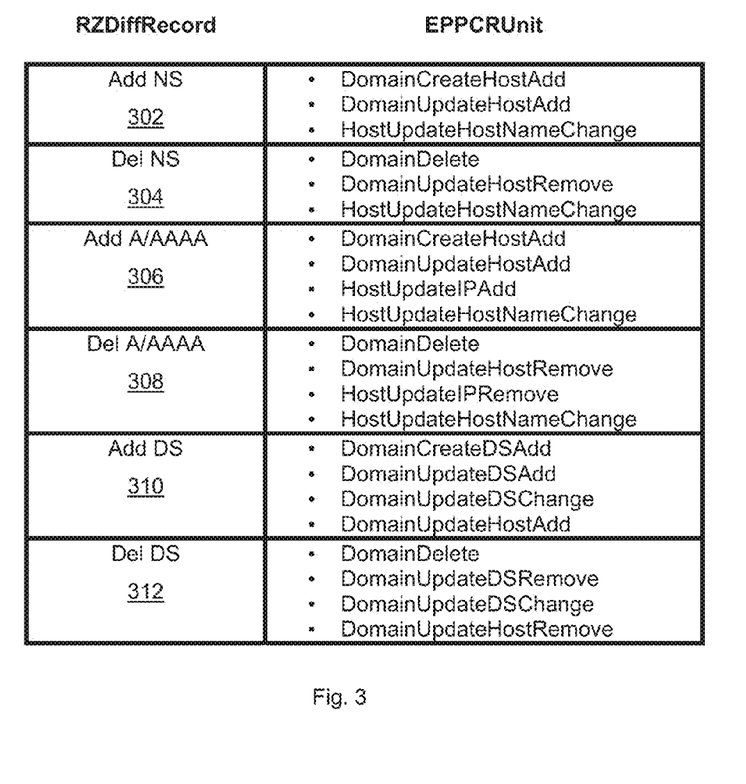
FIG. 3 is a schematic diagram of a correspondence between difference objects and change request units according to some embodiments.

FIG. 3 is a schematic diagram of a correspondence between difference objects and EPPCRUnits according to some embodiments. In particular, each raw difference object 302-312 may correspond with multiple EPPCRUnits. Add NS 302 (add name server) can map to EPPCRUnits DomainCreateHostAdd, DomainUpdateHostAdd, and HostUpdateHostNameChange. Del NS 304 (delete nameserver) can map to DomainDelete, DomainUpdateHostRemove, and HostUpdateHostNameChange. Add A/AAAA 30 (add A or AAAA record) can map to DomainCreateHostAdd, DomainUpdateHostAdd, HostUpdateIPAdd, and HostUpdateHostNameChange. Del A/AAAA 308 (delete A or AAAA record) can map to Domain Delete, DomainUpdateHostRemove, HostUpdateIPRemove, and HostUpdateHostNameChange. Add DS 310 (add delegation signer) can map to DomainCreateDSAdd, DomainUpdateDSAdd, DomainUpdateDSChange, and DomainUpdateHostAdd. Del DS 312 (delete delegation signer) can map to DomainDelete, DomainUpdateDSRemove, DomainUpdateDSChange, and DomainUpdateHostRemove.

FIG. 4 is a schematic diagram illustrating a technique for detecting unrequested zone file changes according to some embodiments. In particular, FIG. 4 depicts a use case of implementing a change request of create domain with two name servers (as in FIG. 1), where one name server is new and one is already serving another domain. Block 402 represents a last published zone file, e.g., from a shadow name server, and block 404 represents a new zone file. An embodiment detects differences between these records using known comparison techniques to produce difference records 406, e.g., root zone change request difference records (RZDiffRecords). (Note that although FIG. 4 is described with respect to a root zone file, embodiments may handle zone files for any zone, not limited to root zones.)

An embodiment then filters, sorts, and parses difference records 406 to produce root zone change request difference records 408, 410, 412. In particular, the records are parsed to generate EPPCRUnits, as illustrated here, for example, records 408 (add name server), 410 (add name server) and 412 (add A record). Also, the difference records 406 are filtered e.g., to remove domain name system security (DNSSEC) records such as NSEC, RRSIG, DNSKEY and SOA. The remaining records are sorted, e.g., by type and timestamp.

An embodiment then matches RZDiffRecords 408, 410, and 412 to change requests, e.g., in the form of EPPCRUnits 414, 416 and 418. If any RZDiffRecord is unmatched at the end of the process, then this indicates that the change reflected by the RZDiffRecord was not the result of a request. The change might be the result of malicious tampering, for example. In the event of an unmatched RZDiffRecord, the embodiment may alert a user by causing an identity of the RZDiffRecord to be displayed.

Note that, as illustrated in FIG. 4, it is possible for multiple RZDiffRecords to map to a single EPPCRUnit. For example, RZDiffRecords 408 and 412 match to EPPCRUnit 416. This situation does not necessarily indicate problematic activity.

Note also that, as illustrated in FIG. 4, it is possible at the end of the matching process to have one or more leftover EPPCRUnit, which are unmatched to any RZDiffRecords. For example, EPPCRUnit 414 is unmatched in FIG. 4. Again, this situation does not necessarily indicate problematic activity. Other systems may perform a check in the other direction, that is, to determine if any change requests have not been implemented as zone file differences.

FIG. 5 is a flowchart of a method for detecting unrequested zone file changes according to some embodiments. The process of FIG. 5 utilizes many of the techniques described in reference to FIGS. 1-4. The process of FIG. 5 may be implemented in a properly programmed electronic computer, for example.

At block 502, the process obtains zone change requests. For embodiments practiced by a register, this block may be performed by electronically accessing electronically stored change requests transmitted to the register. The change requests may be in EPP format, for example.

At block 504, the process parses the change requests into change request units, e.g., RZCRUnits. The actions of block 504 are discussed herein in reference to FIG. 1, for example.

At block 506, the process obtains the last published zone file. For embodiments practiced by a register, this block may be performed by electronically accessing the electronically stored zone file.

At block 508, the process obtains a new zone file. The new zone file may be stored in a shadow name server, for example. The new zone file may be a proposed or tentative replacement zone file, e.g., one that has not yet been published. For embodiments practiced by a register, this block may be performed by electronically accessing an electronically stored new zone file. Publishing the new zone file may depend upon the process illustrated with respect to FIG. 5 succeeding, that is, the process not indicating any suspicious changes unmatched to change requests.

At block 510, the process obtains difference objects. The actions of block 510 are discussed in reference to FIGS. 2 and 4, for example.

At block 512, the process matches difference objects to change request units. The actions of block 512 are discussed in reference to FIGS. 3 and 4, for example. The matching reveals any unmatched difference objects.

At block 514, the process presents any unmatched difference objects to a user of the embodiment. The presentation may be by providing for display on an electronic monitor an identity of the unmatched difference object and/or information characterizing and describing the unmatched difference object. A user may then take steps to investigate the unmatched difference object. The investigation may result in omitting the change from the new zone file prior to publication.

In general, systems capable of performing the presented techniques may take many different forms. Further, the functionality of one portion of the system may be substituted into another portion of the system. Each hardware component may include one or more processors coupled to random access memory operating under control of, or in conjunction with, an operating system. Further, each hardware component can include persistent storage, such as a hard drive or drive array, which can store program instructions to perform the techniques presented herein. That is, such program instructions can serve to perform the disclosed methods. Other configurations of the first and second devices as discussed herein, and other hardware, software, and service resources are possible.

The foregoing description is illustrative, and variations in configuration and implementation are possible. For example, resources described as singular can be plural, and resources described as integrated can be distributed. Further, resources described as multiple or distributed can be combined. The scope of the presented techniques is accordingly intended to be limited only by the following claims.

What is claimed is:

1. A method for monitoring Domain Name System (DNS) zone file changes, the method comprising:
   obtaining at least one zone change request;
   parsing the at least one zone change request to obtain at least one change request unit, wherein each change request unit constitutes a single executable instruction;
   obtaining a last published zone file;
   obtaining an unpublished new zone file;
   comparing the last published zone file to the new zone file to obtain at least one difference object, wherein the at least one difference object identifies a DNS record type, a DNS record, and a difference type;
   matching the at least one difference object to the at least one change request unit to identify at least one unmatched difference object;
   providing a human readable report comprising an indication of the at least one unmatched difference object.

2. The method of claim 1, wherein each change request unit is a smallest possible unit that can be executed on a domain or a host.

3. The method of claim 1, wherein each change request unit is of the form of one of: DomainCreateHostAdd, DomainCreateDSAdd, DomainDelete, DomainUpdateHostAdd, DomainUpdateHostRemove, DomainUpdateDSAdd, DomainUpdateDSRemove, DomainUpdateDSChange, HostUpdateIPAdd, HostUpdateIPRemove, and HostUpdateHostNameChange.

4. The method of claim 1, wherein each difference object comprises a DNSJAVA object.

5. The method of claim 4, wherein each difference object comprises an org.xbill.DNS.record object.

6. The method of claim 1, wherein each difference object is of the form of one of: AddNameServer, DeleteNameServer, AddA/AAAA, DeleteA/AAAA, AddDelegationSigner, and DeleteDelegationSigner.

7. The method of claim 1, wherein the matching comprises, for each difference object, searching for a corresponding change request unit.

8. The method of claim 1, further comprising filtering the at least one difference object to remove DNSSEC records.

9. The method of claim 1, further comprising:
  altering the new zone file to account for the at least one unmatched difference object, whereby a corrected new zone file is produced; and
  providing the corrected new zone file for publishing.

10. The method of claim 1, wherein:
  the at least one zone change request comprises at least one root zone change request;
  the last published zone file comprises a last published root zone file; and
  the new zone file comprises a new root zone file.

11. A system for monitoring zone file changes, the system comprising:
  at least one processor configured to obtain at least one zone change request;
  at least one processor configured to parse the at least one zone change request to obtain at least one change request unit, wherein each change request unit constitutes a single executable instruction;
  at least one processor configured to obtain a last published zone file;
  at least one processor configured to obtain an unpublished new zone file;
  at least one processor configured to compare the last published zone file to the new zone file to obtain at least one difference object, wherein the at least one difference object identifies a domain name system (DNS) record type, a DNS record, and a difference type;
  at least one processor configured to match the at least one difference object to the at least one change request unit to identify at least one unmatched difference object;
  at least one processor configured to generate a human readable report comprising an indication of the at least one unmatched difference object.

12. The system of claim 11, wherein each change request unit is a smallest possible unit that can be executed on a domain or a host.

13. The system of claim 11, wherein each change request unit is of the form of one of: DomainCreateHostAdd, DomainCreateDSAdd, DomainDelete, DomainUpdateHostAdd, DomainUpdateHostRemove, DomainUpdateDSAdd, DomainUpdateDSRemove, DomainUpdateDSChange, HostUpdateIPAdd, HostUpdateIPRemove, and HostUpdateHostNameChange.

14. The system of claim 11, wherein each difference object comprises a DNSJAVA object.

15. The system of claim 11, wherein each difference object comprises an org.xbill.DNS.record object.

16. The system of claim 11, wherein each difference object is of the form of one of: AddNameServer, DeleteNameServer, AddA/AAAA, DeleteA/AAAA, AddDelegationSigner, and DeleteDelegationSigner.

17. The system of claim 11, wherein the at least one processor configured to match is further configured to, for each difference object, search for a corresponding change request unit.

18. The system of claim 11, further comprising at least one processor configured to filter the at least one difference object to remove DNSSEC records.

19. The system of claim 11, further comprising:
  at least one processor configured to alter the new zone file to account for the at least one unmatched item, whereby a corrected new zone file is produced; and
  at least one processor configured to provide the corrected new zone file for publishing.

20. The system of claim 11, wherein:
  the at least one zone change request comprises at least one root zone change request;
  the last published zone file comprises a last published root zone file; and
  the new zone file comprises a new root zone file.

* * * * *